United States Patent
Goodyear

[19]
[11] Patent Number: 5,918,867
[45] Date of Patent: Jul. 6, 1999

[54] MULTIPLE AXIS MOUNTING UNIT

[76] Inventor: Eugene L. Goodyear, 35 Thomas Rd, Hollywood, Fla. 33023

[21] Appl. No.: 08/790,219

[22] Filed: Feb. 3, 1997

Related U.S. Application Data

[63] Continuation-in-part of application No. 08/509,293, Jul. 31, 1995, abandoned.

[51] Int. Cl.[6] .................................................... B23Q 1/04
[52] U.S. Cl. ............................................. 269/71; 269/76
[58] Field of Search ................................ 269/45, 69, 71, 269/76

[56] References Cited

U.S. PATENT DOCUMENTS

| | | | |
|---|---|---|---|
| 1,084,130 | 1/1914 | Cargin ........................................ | 269/76 |
| 1,305,321 | 6/1919 | Tooker ....................................... | 269/76 |
| 1,611,305 | 12/1926 | Ellwood .................................... | 269/71 |
| 2,459,080 | 1/1949 | Killius ....................................... | 269/71 |
| 3,317,205 | 5/1967 | Kerr .......................................... | 269/76 |
| 4,502,457 | 3/1985 | Marron ...................................... | 269/71 |

*Primary Examiner*—Robert C. Watson
*Attorney, Agent, or Firm*—Malin, Haley, DiMaggio & Crosby

[57] ABSTRACT

A mounting unit used to support objects through the use of a base connected to a rotating shaft, which may be moved in a variety of directions and then locked into place. A second rotating shaft is connected to the first rotating shaft. The second rotating shaft is also multi-directional and may be locked into place. Attached to the second rotating shaft is a load bearing mounting plate used to hold the object in place. The mounting plate also pivots in various directions.

6 Claims, 3 Drawing Sheets

MULTIPLE AXIS MOUNTING UNIT

This is a continuation-in-part of U.S. Ser. No. 08/509,293, filed Jul. 31, 1995 now abandoned.

BACKGROUND OF THE INVENTION

1. Field of the Invention

This invention relates to a multiple axis mounting unit which uses a tubular receiver hard-mounted to a surface for support. The unit may be used to firmly fix a workpiece in multiple positions for unlimited accessibility by the user.

2. Description of the Prior Art

Mounting devices are commonly used to support a variety of objects in the workplace. Such devices are used to assemble and disassemble various items. Most mounting systems use movable jaws for clamping. These devices are referred to as vises. Another system is the "jig," which is custom-made to hold the particular item in place.

Systems such as the "vises and "jig" are conventionally fixed in one location about the base of the unit which holds it in place. Most of the systems allow rotation of the clamping jaws around the base of the unit. This is sometimes referred to as "mono-planar motion" or motion in one plane.

The vise described as an Allograft Vise in U.S. Pat. No. 5,092,572 to Litwak and Litwak, Mar. 3, 1992 shows the capability of motion in more than one plane. Not only can the device rotate in the same plane as the more common vises, but it can also rotate in a plane which is perpendicular to the basic plane. Also, it can rotate in a plane which is parallel to the basic plane. This design gives the device multiple axis capability. However, the Allograft Vise depends on a "jaw-like" clamping feature which limits the accessibility of the user. Furthermore, the device does not allow any rotation perpendicular to the mounting base. This also restricts the use of the vise for any work which is below the base plane.

While there are numerous jigs and vises used to hold objects in place, the range in movement of them is limited. For example, the Allograft Vise is used specifically for orthopedic surgery for bone implants. While it allows the vise to be adjusted and then held into place, it does not allow for the rest of the device to rotate or move once the vise is clamped into place on the table. While the Allograft Vise is useful for the narrow purpose of orthopedic surgery, it's planar use is extremely limited. The structure of the Allograft Vise does not allow for much mobility once the vise is clamped into place. The Allograft Vise allows angular adjustment to the vise grip and the tube connecting the vise grip plane to the plate attached to the clamp. However, this plate does not rotate at any angle. It is permanently fixed. Also, due to the type of material from which it is constructed, as well as the structure of the vise, the prior art is not equipped to function well outside of a surgical unit.

SUMMARY OF THE INVENTION

Unlike the prior art, my invention may be used in a multitude of applications. For example, my device may be used to hold engines in place while being worked on. This leaves both hands free to use without having to hold the engine in place. The engine may be rotated and moved in numerous positions, and yet may be locked in place at each rotation or movement. My invention may be manufactured in a variety of sizes. The device may be used in laboratories, garages, homes, etc. It may be used to display an object, allowing the object to be moved around and then fixed in a particular position. The device may be made out of different types of materials, depending upon its intended use. The mounting plate may be turned in a variety of angles or positions and then held or locked in a particular position. At every turn or change of position, the mounting plate may be fixed or locked in that position. This invention provides more mobility for the object while it is fixed on the mounting plate.

My invention solves the problem of holding an object in place, thereby freeing the user's hands. Instead of having to hold the object in place with one hand, while using the other hand to work on the object, this device holds the object, thereby leaving the user's hands unoccupied. This device also allows for the object to be rotated on a variety of axes, yet still holds the object in place. The object, while held into place, may be moved clockwise, counter-clockwise, left, right, backwards, forwards, up, and down. This multiple axis unit solves the problem of access to hard-to-reach areas of the object by allowing the user to have both hands free, as well as allowing the object to be turned and/or left fixed in any of those positions without requiring the use of one's hands to keep the object held in that particular position.

Several objects and advantages of the invention are:

(a) to provide a movable working surface;

(b) to provide a working surface which is mounted on only one side for maximum accessibility;

(c) to provide a work surface which can rotate in multiple directions without obstruction;

(d) to provide a strong and solid mounting work surface;

(e) to provide a mounting work surface that can be locked firmly and positively in any position desired;

(f) to provide the option for work on a workpiece in one of three independent planar systems;

Further objects and advantages are to provide a mounting unit which can be heavily weighted in a cantilever position without deflection or deformation to the mounting structure.

The advantage of this unit is its flexibility in use, size and construction. The structure of the device allows it to be used in all manners of industry. The mounting unit may be used in factories, shops, garages, and in the home. The unit may be manufactured in all manner of sizes, colors, and materials, depending upon the usage. The unit allows an object to be held in place without requiring the use of one's hands. The object may be moved or tilted in a broad spectrum of angles, allowing the user to reach an area of an object which might normally be difficult to reach with only one hand.

For example, the device may be used to hold an engine in place while the engine is being repaired. The locking devices would allow the engine to be moved clockwise, counterclockwise, up, down, back and forth, and with each move allow the engine to be locked into place if necessary. The mounting unit may be used on a large scale in a factory; it could be used on a much smaller scale in a hobbyist's workshop. The device may even be used as a manner to display objects in a department store.

In accordance with these and other objects which will become apparent hereinafter, the instant invention will now be described with particular reference to the accompanying drawings.

DESCRIPTION OF THE PREFERRED EMBODIMENTS

Figure 1:
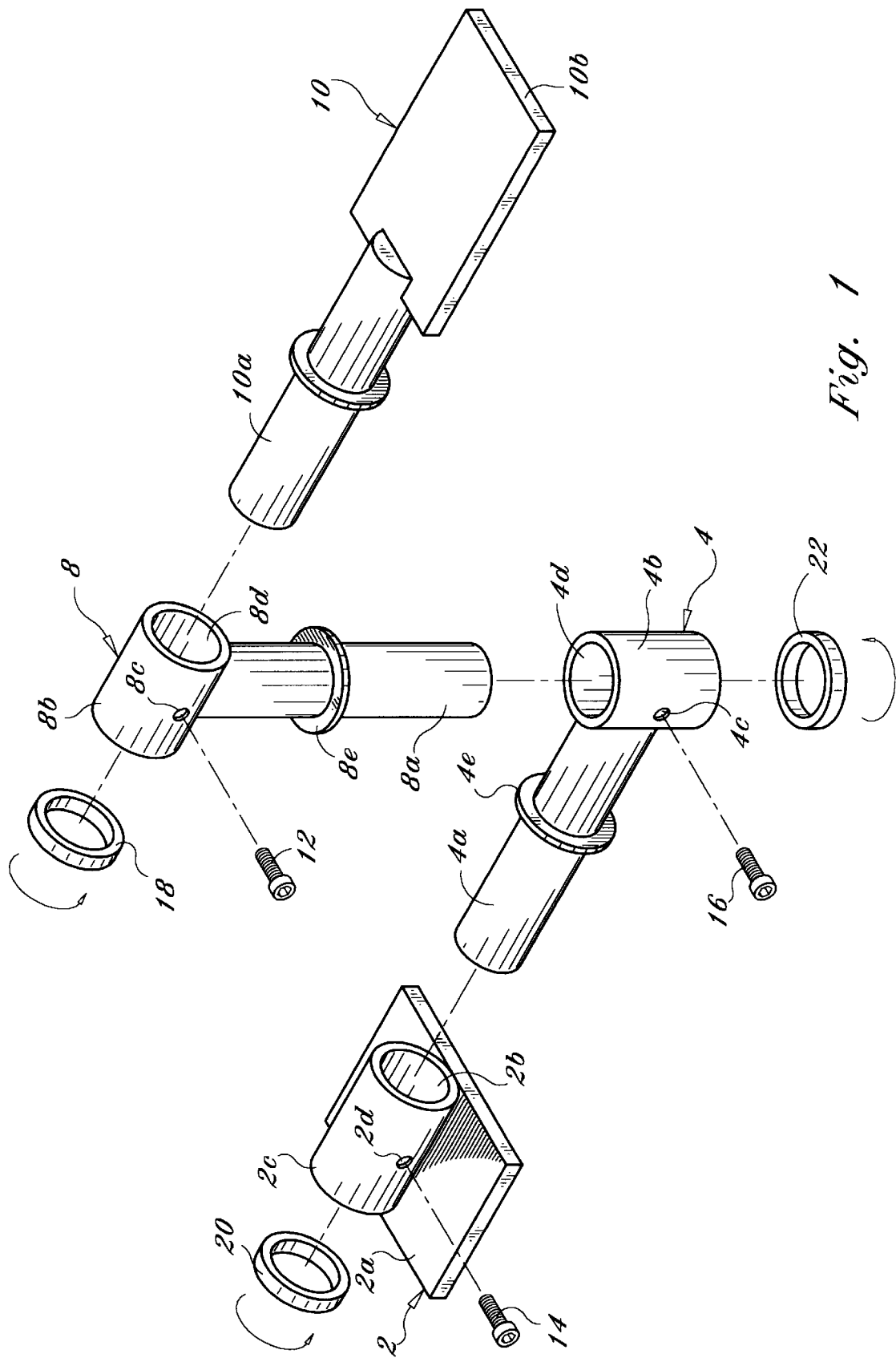
FIG. 1 shows the exploded perspective view of the multiple axis mounting unit in the x-y-z plane with each component of the assembly.
Figure 2:
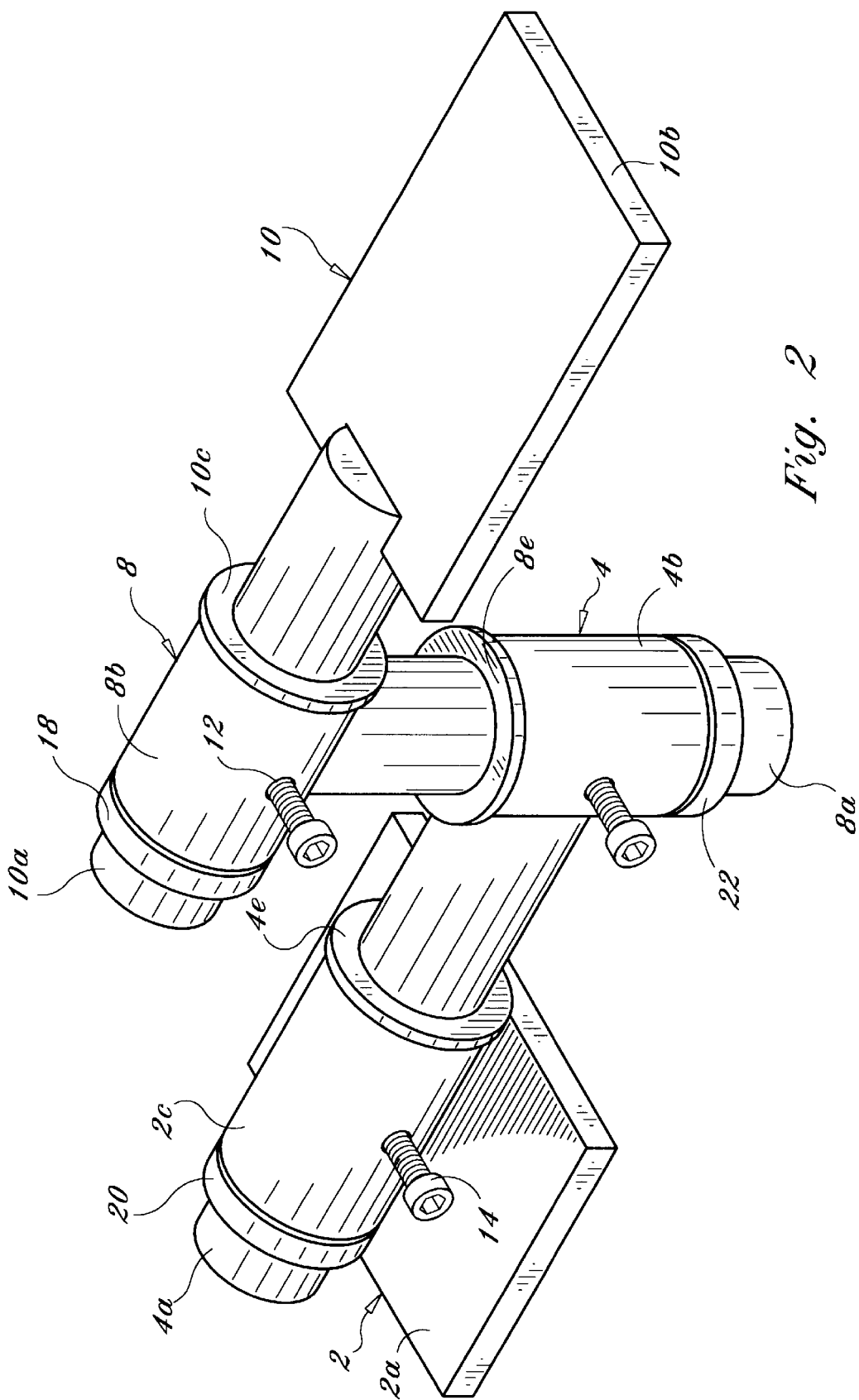
FIG. 2 shows the assembled perspective view of the multiple axis mounting unit in the x-y-z plane in a basic static condition.
Figure 3:
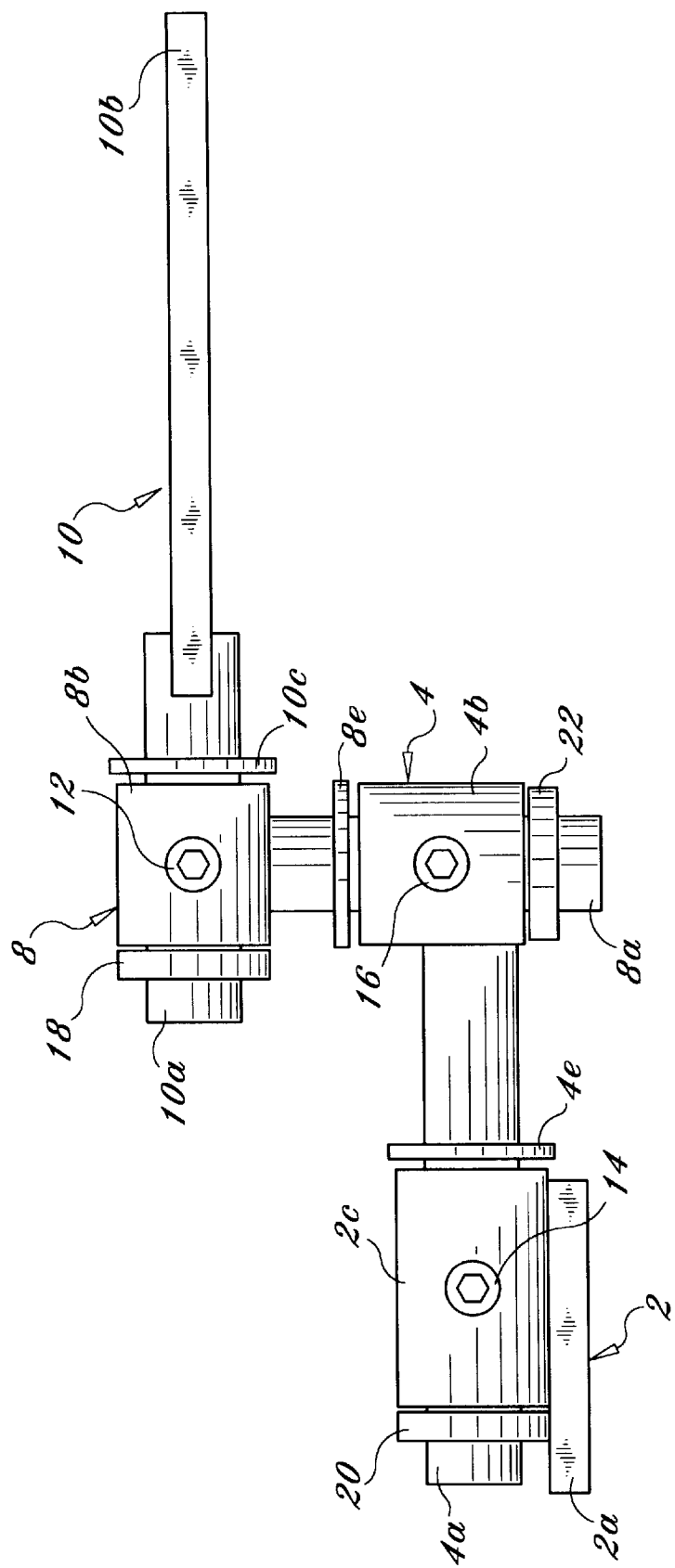
FIG. 3 shows a side view of the multiple axis mounting unit with the various components detailed.

A typical assembly of the present invention is illustrated in FIG. 1 (exploded view), FIG. 2 (perspective view) and FIG. 3 (side view). The assembly has a main base platform comprised of the base plate 2a, the receptacle 2c, the lock cavity 2d, and the receptacle cavity 2b. The base plate 2a consists of a solid plate of material which is high in strength and has high load capacity. Receptacle 2c is firmly mounted to the plate's top surface and offers two basic features. First, the receptacle inner wall is a solid bearing surface with a smooth surface texture for the mating horizontal rotator shaft. Secondly, the receptacle offers a threaded through-hole for the positive locking unit.

The horizontal rotator 4 is comprised of the horizontal rotator main shaft 4a, the horizontal rotator stop collar 4e, the horizontal rotator shaft receptacle 4b, the horizontal rotator shaft lock cavity 4c and the horizontal rotator shaft receptacle cavity 4d. The horizontal rotator main shaft 4a is a solid bar stock material with high strength characteristics. Along the longitudinal axis of the shaft, approximately mid-span, exists the stop collar 4e. The stop collar's outer diameter is considerably larger than the outer diameter of the rotator shaft. Receptacle 4b has a cavity 4d with an inner diameter identical to the base mounting platform receptacle and offers a solid bearing surface with a smooth wall for the mating vertical rotator shaft 8a. The horizontal rotator receptacle also offers a lock cavity 4c for the positive locking feature of the vertical rotator 8.

The vertical rotator shaft 8b is solid with high strength bar stock material and has a smooth surface finish on the outer diameter. With a similar configuration to that of the horizontal rotator, the vertical rotator is also comprised of a stop collar 8e, receptacle 8b, receptacle cavity 8d and a lock cavity 8c. The main difference between the two rotator components is the overall length. The vertical rotator is shorter than the horizontal rotator. Both share identical stop collar and receptacle configurations. The vertical rotator receptacle provides a solid mounting position for the mounting plate main shaft 10a.

The mounting plate 10 is comprised of the mounting plate main shaft 10a and the mounting plate main platform 10b. The main platform is a solid plate which is high in strength and structural stability.

OPERATION—FIGS. 1 TO 3

The multiple axis mounting unit can be used in a variety of applications; however, the operation and function of the system remains constant. Since the unit is comprised of four basic components, the operation is direct and simple.

The mounting plate comprised of the mounting plate main shaft 10a and the mounting plate main platform 10b offers the user the ability to firmly fix any body in place using a variety of fastening methods. The fastening methods can range from bolts to clamps. Once the object is in place, it can be rotated 360 degrees along the mounting plate main shaft's longitudinal axis for unlimited accessibility. Since the shaft of the mounting platform is firmly supported by the vertical rotator receptacle 8b, a variety of functions can be performed to the object without structural failure. Once the object is in a desired position, the mounting plate positive lock 12 can be fastened to assure the user that the object will remain in the rotational orientation of choice.

The horizontal rotator 4 which mates with the vertical rotator 8 includes the horizontal receptacle 4b and the vertical rotator positive lock 16. With the vertical rotator main shaft 8a and the horizontal rotator receptacle 4b joined, the bottom surface of the vertical rotator stop collar 8e will rest on the top surface of the horizontal rotator receptacle 4b. This will allow the mounting plate with the object firmly fixed in position, to rotate about the axis of the vertical rotator until the desired position is locked with the vertical rotator positive lock. The user, up to this point, has been able to rotate the object in completely independent planes; the x-y-z plane of the mounting platform and the x-y-z plane of the vertical rotator.

The horizontal rotator offers a third x-y-z plane for motion. Since the horizontal rotator mates with the base mounting platform receptacle 2c, the object, the mounting platform, vertical rotator and horizontal rotator are able to rotate about the longitudinal axis of the horizontal rotator. Furthermore, the complete configuration can be moved along the axis of each receptacle for added position options. Once all of the locks are in place, the object will be in a completely stationary state with no movement. Both FIGS. 2 and 3 show the multiple axis mounting unit in an assembled fixed state.

The multiple axis mounting unit base 2 is firmly fixed to a solid surface of any type. The base can be mounted to the surface by several methods. For example, the user can mount the unit with bolts and nuts or the unit can be mounted with clamping devices.

As also seen in the drawings, stop rings 18, 20 and 22 are preferably provided for mating with shafts 10a, 4a, and 8a, respectively. As rings 18, 20 and 22 all operate similarly, only ring 18 and its mating relationship with shaft 10a will be discuss below. However, it should be understood that the mating relationships of rings 20 and 22 to shafts 4a and 8a, respectively, are similar in structure and function to the below described relationship of ring 18 with shaft 10a.

Ring 18, preferably includes a threaded aperture for receipt and mating with the exposed end of shaft 10a which protrudes out of receptacle 8b. At least a portion of the exposed end of shaft 10a will be provided with threads for mating with the threaded aperture of ring 18. In lieu of threads for the aperture of ring 18 and exposed end of shaft 10a, the size of ring 18's aperture can be sized to provide a tight friction fit along shaft 10a. Other conventional mating devices can also be utilized and are considered within the scope of the invention. Once ring 18 is properly disposed along shaft 10a, shaft 10a is prevented from inadvertently becoming dislodged or removed from receptacle 10b (stop ring 18 on one end and stop collar 10c on the other end), no matter what rotational position any of the shafts 4a, 8a, and 10a are currently disposed at, thus preventing injury to the user. Similarly rings 20 and 22 along with stop collars 4e and 8e, respectively, prevent accidental removal of respective shafts 4a and 8a from their respective receptacles 2c and 4b.

Some features of the present invention include:

(1) The multiple axis mounting unit comprises a base mounting plate, with two rotating shafts, each with locking devices, and a load-bearing mounting plate which may support an object during the procedure for which this device is required;

(2) The base mounting plate unit in claim one is attached to a receptacle, lock cavity, and receptacle cavity;

(3) Attached to the base mounting plate is the horizontal rotator main shaft. The horizontal rotator main shaft includes the horizontal rotator shaft stop collar, horizontal rotator shaft receptacle, horizontal rotator shaft lock cavity, and horizontal rotator shaft receptacle cavity;

(4) The vertical rotator main shaft is attached to the horizontal rotator main shaft of claim three. The vertical rotator main shaft consists of a vertical rotator shaft stop collar, vertical rotator shaft receptacle, vertical rotator shaft lock cavity, and vertical rotator shaft receptacle cavity;

(5) The vertical rotator main shaft connects to the mount plate main shaft, which is comprised of the mount plate main platform;

(6) The multiple axis mounting unit may be composed of any solid form of material or substance which is strong enough to hold an object in place;

(7) The size of the mounting unit may vary. It may be custom-made to specification for the object which is to be held in place;

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A movable working surface which can be rotated in multiple directions without obstruction to allow an object to be rotated on a variety of axes, said movable working surface, comprising:

a first receptacle secured to a surface;

a first rotator shaft, said first rotator shaft having a first end and a second end, at least a portion of the first end of said first rotator shaft disposed within said first receptacle, said first rotator shaft capable of being rotated 360° degrees and locked at any desired position along its 360° degree rotation;

a second receptacle disposed at the second end of said first rotator shaft;

a second rotator shaft, said second rotator shaft having a first end and a second end, at least a portion of the first end of said second rotator shaft disposed within said second receptacle, said second rotator shaft capable of being rotated 360° degrees and locked at any desired position along its 360° degree rotation;

a third receptacle disposed at the second end of said second rotator shaft;

a third rotator shaft, said third rotator shaft having a first end and a second end, at least a portion of the first end of said third rotator shaft disposed within said third receptacle, said third rotator shaft capable of being rotated 360° degrees and locked at any desired position along its 360° degree rotation;

a mounting plate disposed at the second end of said third rotator shaft;

wherein an object attached to said mounting plate is capable of being rotated on a variety of axes thus allowing the object to be moved in a plurality of directions including clockwise, counter-clockwise, left, right, backwards, forwards, up and down;

wherein said first rotator shaft having a first longitudinal axis and including a first stop collar disposed along a portion of said first longitudinal axis; wherein said second rotator shaft having a second longitudinal axis and including a second stop collar disposed along a portion of said second longitudinal axis; and wherein said third rotator shaft having a third longitudinal axis and including a third stop collar disposed along a portion of said third longitudinal axis.

2. The movable working surface of claim 1 wherein said first stop collar properly positioning said first rotator shaft within said first receptacle, said second stop collar properly positioning said second rotator shaft within said second receptacle, said third stop collar properly positioning said third rotator shaft within said third receptacle.

3. A movable working surface which can be rotated in multiple directions without obstruction to allow an object to be rotated on a variety of axes, said movable working surface, comprising:

a first receptacle secured to a surface;

a first rotator shaft, said first rotator shaft having a first end and a second end, at least a portion of the first end of said first rotator shaft disposed within said first receptacle, said first rotator shaft capable of being rotated 360° degrees and locked at any desired position along its 360° degree rotation;

a second receptacle disposed at the second end of said first rotator shaft;

a second rotator shaft, said second rotator shaft having a first end and a second end, at least a portion of the first end of said second rotator shaft disposed within said second receptacle, said second rotator shaft capable of being rotated 360° degrees and locked at any desired position along its 360° degree rotation;

a third receptacle disposed at the second end of said second rotator shaft;

a third rotator shaft, said third rotator shaft having a first end and a second end, at least a portion of the first end of said third rotator shaft disposed within said third receptacle, said third rotator shaft capable of being rotated 360° degrees and locked at any desired position along its 360° degree rotation;

a mounting plate disposed at the second end of said third rotator shaft;

wherein an object attached to said mounting plate is capable of being rotated on a variety of axes thus allowing the object to be moved in a plurality of directions including clockwise, counter-clockwise, left, right, backwards, forwards, up and down;

wherein a portion of said first rotator shaft protruding out of said first receptacle and said movable working surface further including a first ring member disposed on the protruding portion of said first rotator shaft; wherein a portion of said second rotator shaft protruding out of said second receptacle and said movable working surface further including a second ring member disposed on the protruding portion of said second rotator shaft; wherein a portion of said third rotator shaft protruding out of said third receptacle and said movable working surface further including a third ring member disposed on the protruding portion of said third rotator shaft.

4. The movable working surface of claim 1 wherein a portion of said first rotator shaft protruding out of said first receptacle and said movable working surface further including a first ring member disposed on the protruding portion of said first rotator shaft; wherein a portion of said second rotator shaft protruding out of said second receptacle and said movable working surface further including a second ring member disposed on the protruding portion of said second rotator shaft; wherein a portion of said third rotator shaft protruding out of said third receptacle and said movable working surface further including a third ring member disposed on the protruding portion of said third rotator shaft; wherein said first ring member and said first stop collar preventing said first rotator shaft from being inadvertently removed from its disposal within said first receptacle; wherein said second ring member and said second stop collar preventing said second rotator shaft from being inadvertently removed from its disposal within said second receptacle; wherein said third ring member and said third stop collar preventing said third rotator shaft from being inadvertently removed from its disposal within said third receptacle.

5. A movable working surface which can be rotated in multiple directions without obstruction to allow an object to be rotated on a variety of axes, said movable working surface, comprising:

a first receptacle secured to a surface;

a first rotator shaft, said first rotator shaft having a first end and a second end, at least a portion of the first end of said first rotator shaft disposed within said first receptacle, said first rotator shaft capable of being rotated 360° degrees, said first rotator shaft having a first longitudinal axis and including a first stop collar disposed along a portion of said first longitudinal axis, said first stop collar properly positioning said first rotator shaft within said first receptacle;

a first locking means for maintaining said first rotator shaft at any desired position along its 360° degree rotation;

a second receptacle disposed at the second end of said first rotator shaft;

a second rotator shaft, said second rotator shaft having a first end and a second end, at least a portion of the first end of said second rotator shaft disposed within said second receptacle, said second rotator shaft capable of being rotated 360° degrees, said second rotator shaft having a second longitudinal axis and including a second stop collar disposed along a portion of said second longitudinal axis, said second stop collar properly positioning said second rotator shaft within said second receptacle;

a second locking means for maintaining said second rotator shaft at any desired position along its 360° degree rotation;

a third receptacle disposed at the second end of said second rotator shaft;

a third rotator shaft, said third rotator shaft having a first end and a second end, at least a portion of the first end of said third rotator shaft disposed within said third receptacle, said third rotator shaft capable of being rotated 360° degrees, said third rotator shaft having a third longitudinal axis and including a third stop collar disposed along a portion of said third longitudinal axis, said third stop collar properly positioning said third rotator shaft within said third receptacle;

a third locking means for maintaining said third rotator shaft at any desired position along its 360° degree rotation;

a mounting plate disposed at the second end of said third rotator shaft;

wherein a rotational position of said first rotator shaft can be adjusted without moving said first rotator shaft in any axial direction, a rotational position of said second rotator shaft can be adjusted without moving said second rotator shaft in any axial direction, and a rotational position of said third rotator shaft can be adjusted without moving said third rotator shaft in any axial direction;

wherein said first, second and third locking means are disposed out of any rotational plane to avoid any obstruction when rotating said first rotator shaft, said second rotator shaft or said third rotator shaft;

wherein an object attached to said mounting plate is capable of being rotated on a variety of axes thus allowing the object to be moved in a plurality of directions including clockwise, counter-clockwise, left, right, backwards, forwards, up and down.

6. The movable working surface of claim 5 wherein a portion of said first rotator shaft protruding out of said first receptacle and said movable working surface further including a first ring member disposed on the protruding portion of said first rotator shaft; wherein a portion of said second rotator shaft protruding out of said second receptacle and said movable working surface further including a second ring member disposed on the protruding portion of said second rotator shaft; wherein a portion of said third rotator shaft protruding out of said third receptacle and said movable working surface further including a third ring member disposed on the protruding portion of said third rotator shaft; wherein said first ring member and said first stop collar preventing said first rotator shaft from being inadvertently removed from its disposal within said first receptacle; wherein said second ring member and said second stop collar preventing said second rotator shaft from being inadvertently removed from its disposal within said second receptacle; wherein said third ring member and said third stop collar preventing said third rotator shaft from being inadvertently removed from its disposal within said third receptacle.

* * * * *